United States Patent
Hoang

(10) Patent No.: US 9,736,488 B2
(45) Date of Patent: Aug. 15, 2017

(54) DECODING FOR HIGH EFFICIENCY VIDEO TRANSCODING

(71) Applicant: Freescale Semiconductor, Inc., Austin, TX (US)

(72) Inventor: Dzung Hoang, Austin, TX (US)

(73) Assignee: NXP USA, Inc., Austin, TX (US)

( * ) Notice: Subject to any disclaimer, the term of this patent is extended or adjusted under 35 U.S.C. 154(b) by 483 days.

(21) Appl. No.: 14/092,524

(22) Filed: Nov. 27, 2013

(65) Prior Publication Data
US 2015/0146794 A1    May 28, 2015

(51) Int. Cl.
| H04N 19/40 | (2014.01) |
| H04N 19/13 | (2014.01) |
| H04N 21/2343 | (2011.01) |
| H04N 19/129 | (2014.01) |
| H04N 19/88 | (2014.01) |
| H04N 19/96 | (2014.01) |
| H04N 19/91 | (2014.01) |

(52) U.S. Cl.
CPC .......... *H04N 19/40* (2014.11); *H04N 19/129* (2014.11); *H04N 19/13* (2014.11); *H04N 19/88* (2014.11); *H04N 19/91* (2014.11); *H04N 19/96* (2014.11); *H04N 21/234309* (2013.01)

(58) Field of Classification Search
CPC .... H04N 19/40; H04N 19/176; H04N 19/129; H04N 19/13; H04N 19/88; H04N 21/234309
See application file for complete search history.

(56) References Cited

U.S. PATENT DOCUMENTS

| 6,426,771 B1* | 7/2002 | Kosugi | H04N 5/772 345/555 |
| 2013/0114735 A1* | 5/2013 | Wang | H04N 19/176 375/240.23 |
| 2013/0279817 A1* | 10/2013 | Wan | H04N 19/13 382/233 |
| 2014/0086306 A1* | 3/2014 | Esenlik | H04N 19/46 375/240.02 |
| 2015/0055715 A1* | 2/2015 | Hendry | H04N 19/436 375/240.25 |

OTHER PUBLICATIONS

International Standard: Information Technology—High Efficiency Coding and Media Delivery in Heterogeneous Environments—Part 2: High Efficiency Video Coding, ISO/IEC FDIS 23008-2, 2013, 312 pages.
ITU-T Telecommunication Standardization Sector of ITU, "Series H: Audiovisual and Multimedia Systems: Infrastructure of Audiovisual Services—Coding of Moving Video: High Efficiency Video Coding," Recommendation ITU-T H.265, Apr. 2013, 317 pages.

* cited by examiner

*Primary Examiner* — Robert Hance

(57) ABSTRACT

A two-stage context adaptive binary arithmetic coding (CABAC) parser is provided to efficiently transcode an input video bitstream that is partitioned into tiles into a non-tiled based video bitstream. A picture of the input video bitstream is partitioned into one or more tiles, each of which has multiple coding tree units (CTUs) according to the HEVC standard. The two-stage CABAC parser parses the input video bitstream in tile scan order in the first stage and generates a list of identified CTUs, whose CABAC state data are saved for the second stage parsing. In the second stage parsing, the two-stage parser parses the same input video bitstream in raster scan order using the saved CABAC state data of the identified CTUs.

23 Claims, 10 Drawing Sheets

DECODING FOR HIGH EFFICIENCY VIDEO TRANSCODING

BACKGROUND

1. Field of Art

The disclosure generally relates to digital video processing, more particularly, to the transcoding of a tile based video sequence into a non-tile based video sequence by efficient tile decoding.

2. Description of the Related Art

New challenges to video representation and transmission systems have been posed by increasingly diverse digital video applications, e.g., video conferencing, telepresence systems, and high definition TV (HDTV), with various formats transmitted through heterogeneous wired and wireless networks to various receiving devices. Video transcoding is one of the promising technologies to meet such challenges by providing conversion of a video sequence in one format to another. A format of a video sequence is generally defined by one or more characteristics of the video sequence, e.g., bit-rates, spatial resolutions and video coding standards such as H.264/Advanced Video Coding (AVC), Moving Picture Experts Group (MPEG)-2 and most recent High Efficiency Video Coding (HEVC) standard.

FIG. 2 illustrates a generic system architecture of a video transcoder for video transcoding. An input video sequence 201 is received by a video encoder, Encoder-1 202, which compresses video frames of the input video sequence 201 into a video stream 203 in a first video format supported by the encoder 202. A video transcoder 210 receives the compressed video sequence 203 for transcoding. The video transcoder 210 comprises a video decoder, Decoder-1 204, and a video encoder, Encoder-2 206. The decoder 204 decodes the compressed video sequence 203 into an uncompressed video sequence 205. Generally, the decoder 204 corresponds to the encoder 202 and is configured to support the first video format used by the encoder 202. The uncompressed video sequence 205 is re-encoded by a second encoder, Encoder-2 206, into a compressed video stream 207 according to a second video format. The first video format and second video format can be different in terms of bit-rates, spatial resolutions and video coding standards. The re-encoded video sequence 207 is decoded by a second decoder, Decoder-2 208, which corresponds to the second encoder 206. The decoder 208 generates an output video sequence 209 in the second video format for further processing such as displaying on a client device.

To transcode an HEVC video (e.g., input video sequence 201) into an AVC video (e.g., output video sequence 209) using the exemplary system architecture illustrated in FIG. 2, Encoder-1 202 is configured to compress the input video sequence 201 into an HEVC-compatible video sequence in an HEVC format. The Encoder-1 202 may partition the input video sequence 201 into tiles and encode the tiles according to the HEVC video coding standard. The video transcoder 210 receives the encoded video sequence in the HEVC video format and decodes the video sequence into an uncompressed video sequence. The video transcoder 210 re-encodes the uncompressed video sequence into a video sequence in a non-tile based AVC video format. The re-encoded video sequence is decoded by the Decoder-2 208, which generates an output video sequence 209 in the AVC video format.

The HEVC standard is designed to support existing applications of H.264/AVC and to facilitate parallel processing architectures. The video coding layer of the HEVC standard is based on the same block-based hybrid coding architecture as previous coding standards. However, comparing with core coding block, e.g., macroblock containing a 16×16 block of luma samples, in previous coding standards, the HEVC standard employs a flexible quad-tree coding block partitioning, which allows a video frame/picture to be partitioned into tiles, slices and coding tree units. Tile coding provided by the HEVC standard poses challenges to video transcoding that converts a tile based HEVC video into a non-tile based video, such as AVC or MPEG-2 video, due to different processing orders and context models required for entropy coding of the coding blocks. Using the example illustrated in FIG. 2, the video transcoder 210 configured for HEVC-to-AVC transcoding needs a solution to efficiently transcode an input video sequence partitioned into tiles by an HEVC encoder into an output video sequence that is not tile based for backward compatibility such as AVC and/or MPEG-2 videos.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

Figure 1:
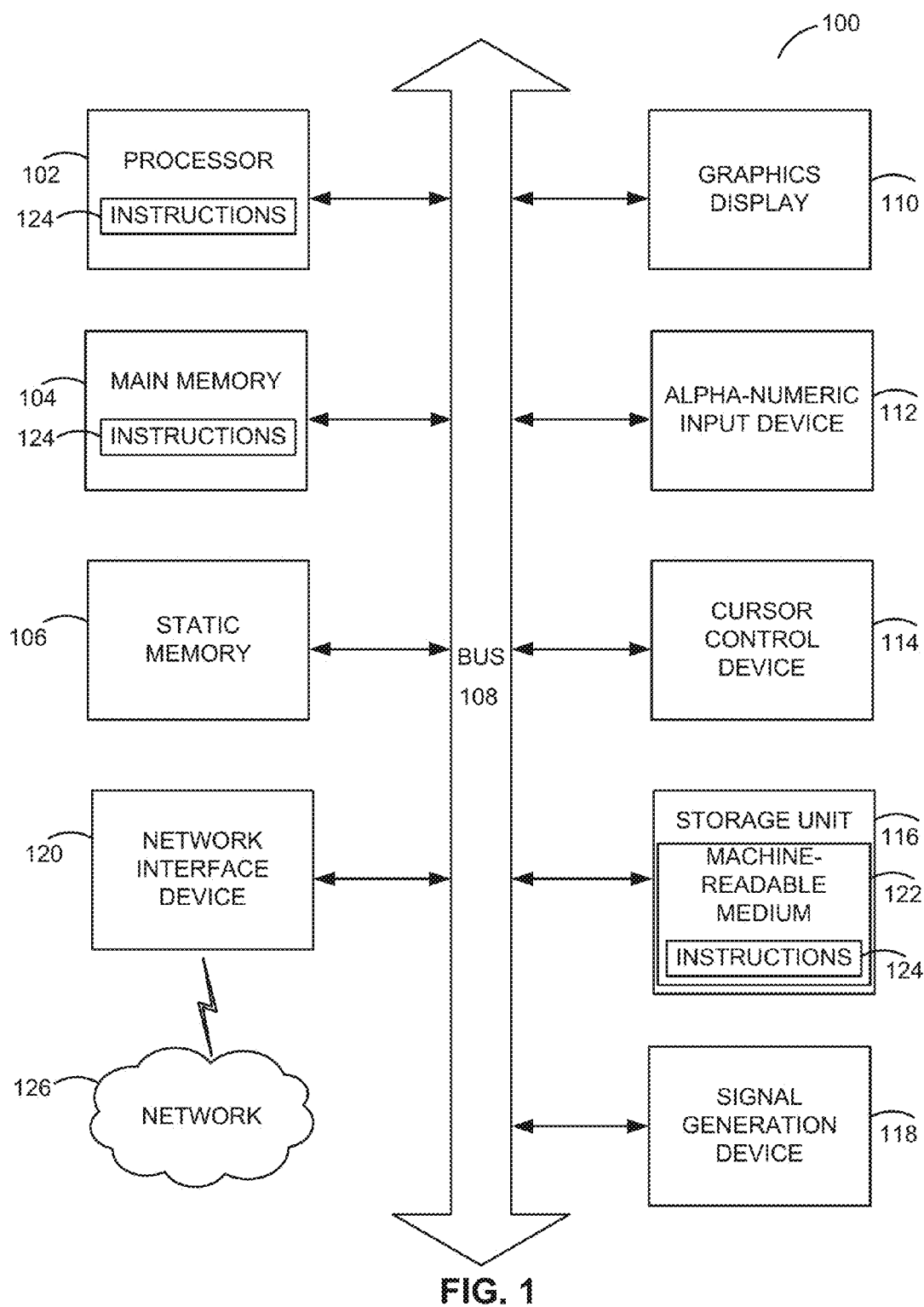
FIG. 1 illustrates one embodiment of components of an example machine able to read instructions from a machine-readable medium and execute them in a processor (or controller).
Figure 2:
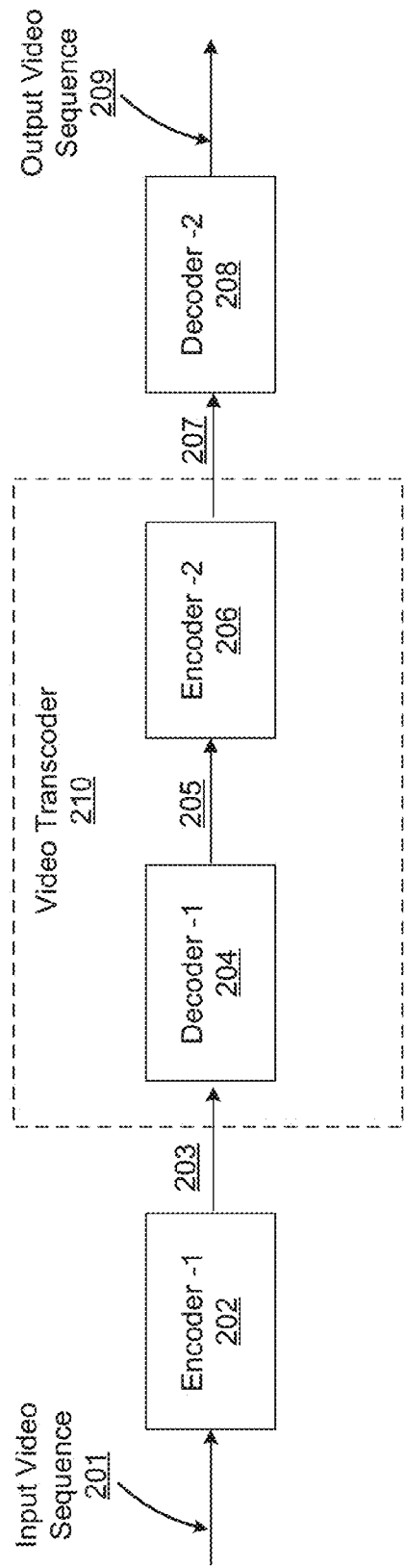
FIG. 2 illustrates a generic system architecture of a video transcoder for video transcoding.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview—Efficient Tile Decoding for Video Transcoding

To efficiently transcode an input video sequence that is partitioned into tiles into a non-tiled based video, a tile processing module is provided to parse a tile based input video sequence in two phases. A picture of a tile based video sequence is partitioned into one or more tiles, each of which has multiple coding tree units (CTUs). One embodiment of the tile processing module as disclosed has a two-stage context adaptive binary arithmetic coding (CABAC) parser for parsing an encoded HEVC video bitstream in two stages. One embodiment of the two-stage CABAC parser has a first CABAC parser configured to parse the HEVC video bitstream in tile scan order and a second CABAC parser configured to parse the same encoded HEVC video bitstream in raster scan order using auxiliary data generated during the first stage parsing.

In the first stage parsing, the first CABAC parser is configured to identify multiple CTUs of a picture of the HEVC video bitstream. The identified CTUs include first CTU on the first row and first column of each tile and CTUs whose position in tile scan order is different from its corresponding position in raster scan order. For each identified CTU, the first CABAC parser is configured to store CABAC state data associated with each identified CTUs as auxiliary data for second stage parsing. The first CABAC parser is further configured to generate a list containing the identified CTUs.

In the second stage parsing, the second CABAC parser of the two-stage parser is configured to parse the same HEVC video bitstream processed by the first stage parser. The parsing operation comprises sorting the list of the identified CTUs in a raster scan order and applying the saved CABAC state data of an identified CTU to one or more CTUs that follow the identified CTU on a same CTU row within a tile. The second stage parser is further configured to decode a compressed bitstream, e.g., the same HEVC video bitstream processed by the first stage parser, into one or more syntax elements such as coefficient data and motion vectors. The syntax elements are communicated to a decoder for further processing.

Computing Machine Architecture

FIG. 1 is a block diagram illustrating components of an example machine able to read instructions from a machine-readable medium and execute them in a processor (or controller). Specifically, FIG. 1 shows a diagrammatic representation of a machine in the example form of a computer system 100 within which instructions 124 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 124 (sequential or otherwise) that specify actions to be taken by that machine. Further, while only a single machine is illustrated, the term "machine" shall also be taken to include any collection of machines that individually or jointly execute instructions 124 to perform any one or more of the methodologies discussed herein.

The example computer system 100 includes one or more processors (generally processor 102) (e.g., central processing unit (CPU), graphics processing unit (GPU), digital signal processor (DSP), one or more application specific integrated circuits (ASICs), one or more radio-frequency integrated circuits (RFICs), or any combination of these), a main memory 104, and a static memory 106, which are configured to communicate with each other via a bus 108. The computer system 100 may further include graphics display unit 110 (e.g., a liquid crystal display (LCD), a projector, or a cathode ray tube (CRT)). The computer system 100 may also include alphanumeric input device 112 (e.g., a keyboard), a cursor control device 114 (e.g., a mouse, a trackball, a joystick, a motion sensor, or other pointing instrument), a storage unit 116, a signal generation device 118 (e.g., a speaker), and a network interface device 120, which also are configured to communicate via the bus 108.

The storage unit 116 includes a machine-readable medium 122 (e.g., non-transitory computer-readable storage medium) on which is stored instructions 124 (e.g., software) embodying any one or more of the methodologies or functions described herein. The instructions 124 (e.g., software) may also reside, completely or at least partially, within the main memory 104 or within the processor 102 (e.g., within a processor's cache memory) during execution thereof by the computer system 100, the main memory 104 and the processor 102 also constituting machine-readable media. The instructions 124 (e.g., software) may be transmitted or received over a network 126 via the network interface device 120.

While machine-readable medium 122 is shown in an example embodiment to be a single medium, the term "machine-readable medium" should be taken to include a single medium or multiple media (e.g., a centralized or distributed database, or associated caches and servers) able to store instructions (e.g., instructions 124). The term "machine-readable medium" shall also be taken to include any medium that is capable of storing instructions (e.g., instructions 124) for execution by the machine and that cause the machine to perform any one or more of the methodologies disclosed herein. The term "machine-readable medium" includes, but not be limited to, data repositories in the form of solid-state memories, optical media, and magnetic media.

Tile Decoding—Spatial Subdivision of a Video Frame

To improve video coding efficiency, the HEVC standard allows a video frame/picture to be partitioned and grouped into various sizes of blocks, including coding tree units (CTUs), slices and tiles. The spatial subdivision of a video frame as defined by the HEVC requires efficient processing of the blocks, especially during entropy encoding of the blocks, to improve compression throughput speed, compression performance and to reduce entropy coding context memory requirements. It is noted that the terms "frame" and "picture" are used interchangeably for the simplicity of description of the embodiments described herein.

Coding tree units (CTUs) defined by the HEVC standard are the smallest fix-sized coding units at video coding layer. Compared with analogous structure of traditional macroblock, containing a 16×16 block of luma samples and, two corresponding 8×8 blocks of chroma samples in case of 4:2:0 color sampling, every CTU in a frame of a tile based video sequence has the same size in terms of pixel samples. The size of a CTU can be either 16×16, 32×32, or 64×64 pixels and is constant within a coded video sequence.

Like the prior coding standards, e.g., H.264/AVC, the HEVC standard also defines slices, which are a sequence of CTUs that are processed in the order of a raster scan. A video frame may be split into one or several slices. The slices allow for resynchronization after data losses. During entropy encoding of the slices using context adaptive binary arithmetic coding (CABAC), the CABAC contexts are reset at the start of a slice and no coding dependencies across slice boundaries are allowed with the exception of in-loop filtering applied to reconstructed pixel samples.

In addition to slices and CTUs, the HEVC standard also defines tiles that are independently decodable regions of a picture and are encoded with some shared header information across the picture. A picture is divided into one or more tiles arranged in a rectilinear grid. The number of the tile rows and tile columns are specified in the picture parameters set (PPS). The tile structure can be uniform or non-uniform, as specified by the "uniform_spacing_flag" in the PPS. When the "uniform_spacing_flag" is set, the width (and height, respectively) of each tile is set to be within +/−1 of each other. If the flag is not set, the width of each tile column (except the last) and the height of each tile row (except the last) are specified in the PPS. Within a tile, the CTUs are processed in raster order. Tiles within a frame, in turn, are processed in raster order.

Figures 3A, 3B:
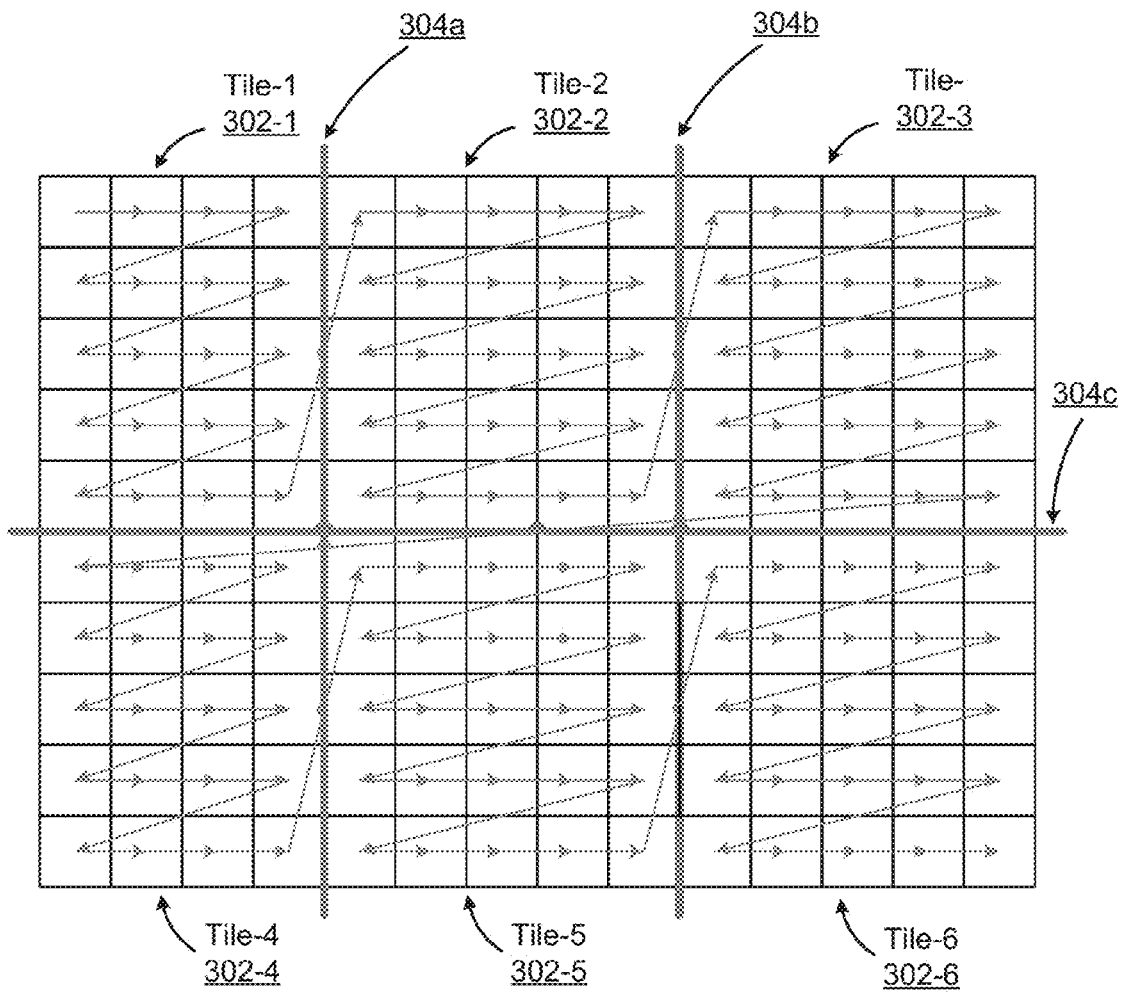
FIG. 3A is an exemplary partitioning of a video frame/picture of a video sequence into tiles and a tile processing order.
FIG. 3B is an exemplary tile of a tile based video frame/picture and its internal coding tree units (CTUs).

To further illustrate the spatial subdivisions of a picture described above, FIG. 3A provides an example of partitioning a picture of a video sequence into tiles and a tile processing order. The picture illustrated in FIG. 3A is partitioned into six tiles, Tile-1 (302-1), Tile-2 (302-2), Tile-3 (302-3), Tile-4 (302-4), Tile-5 (302-5) and Tile-6 (302-6). The boundary lines, 304*a*, 304*b* and 304*b*, mark the boundaries between the tiles. For example, 304*a* marks the vertical boundary between Tile-1 and Tile-2 and the vertical boundary between Tile-4 and Tile-5. Each tile has a number of CTUs and two tiles do not necessarily have the same number of CTUs. For example, Tile-1 302-1 has 20 CTUs while Tile-2 302-2 has 25 CTUs.

To process tiles within a picture, the HEVC standard defines a tile scan order as illustrated in FIG. 3A. As indicated by the arrows illustrated FIG. 3A, the tile scan order of the six tiles is: Tile-1, Tile-2, Tile-3, Tile-4, Tile-5 and Tile-6. Within a tile, the CTUs are processed in an order of raster scan, starting from the first CTU on the first row and the first column of the tile. After all the CTUs on the first row are processed, CTUs of second row below the first row are processed, again from the left to the right, until all the CTUs the last row are processed. After the first tile (e.g., Tile-1) is processed, the CTUs of the first row of the horizontal neighboring tile (i.e., Tile-2) are processed until all the tiles of the last tile (i.e., Tile-6) are processed.

FIG. 3B is an exemplary tile of a picture and its internal CTUs. In connection with FIG. 3A, the exemplary tile illustrated in FIG. 3B corresponds to Tile-1 302-1 illustrated in FIG. 3A. The Tile-1 302-1 has 20 CTUs, which are divided by five rows and 4 columns. The 20 CUTs of the Tile-1 302-1 are processed in an order of raster scan, starting from CTU1 and ending at CTU 20. The first four CTUs, CTU 1-CTU 4 on the first row, are processed and followed by the next four CTUs, CTU 5-CTU8, on the next row, until the last row of CTUs, CTU 17-CTU 20 are processed.

In one embodiment, the processing operation on the CTUs of a picture is parsing an encoded video bitstream for entropy coding of the CTUs using CABAC entropy coding. In a CABAC encoder, a syntax element of an encoded video bitstream is first decomposed into a series of binary symbols (bins). Each bin is coded using an associated context model that may be selected depending upon the previously encoded neighboring bins or syntax elements. The selected context model and the bin value are used by an arithmetic coder to generate a new bitstream. The selected context model is then updated according to the value of the coded bin.

To entropy code a slice or tile in a picture according to the HEVC standard, a CABAC module is initialized at the start of the slice, the start of the tile or other positions as specified in the standard. The initialization comprises setting all the context models and the arithmetic coder variables to an initial state. In the bitstream parsing process, certain contextual variables, such as variable "IsCuQpDeltaCoded", are used in the parsing process. The CABAC context models, the arithmetic coder variables, the contextual variables, and the current bitstream position are collectively referred to as "CABAC state" from hereon and throughout the entire specification.

Figure 3C:
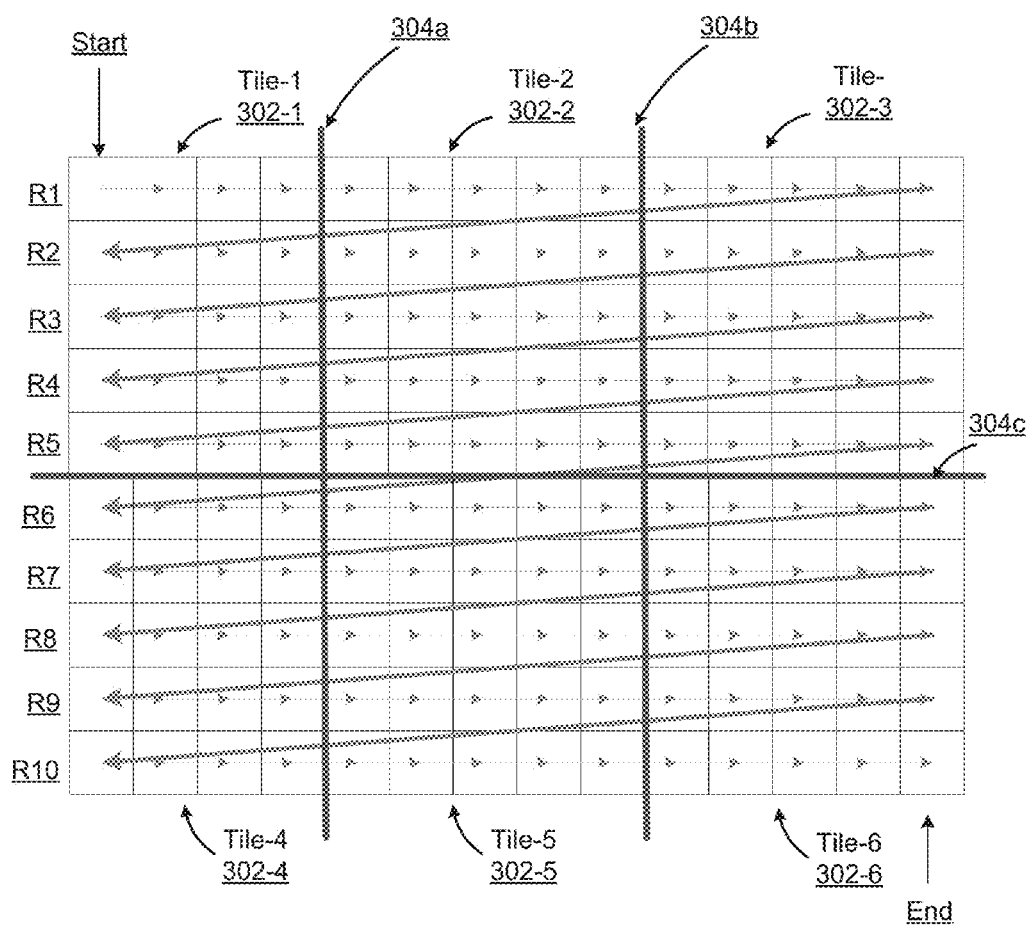
FIG. 3C is an exemplary non-tile based video frame/picture with a raster scan processing order.

In contrast to the tile scan order defined for HEVC videos, a picture of videos compressed under the prior coding standards such as H.264/AVC or MPEG-2 uses a raster scan order processing of macroblocks through the entire picture. FIG. 3C is an exemplary non-tile based picture with a raster scan processing order. The picture illustrated in FIG. 3C corresponds to the tile based picture illustrated in FIG. 3A. To illustrate the differences between the tile scan order used to parse the tile based picture of FIG. 3A and the raster scan order applied to the non-tiled based picture illustrated in FIG. 3C, the tiles and tile boundaries applied to the picture in FIG. 3A are also shown in FIG. 3C for the simplicity of illustration. For a non-tile based picture as the one in FIG. 3C, the macroblocks of pixels in the first row, R1, of the picture are processed before the macroblocks of pixels in the second row, R2, are processed. In other words, the macroblocks of pixels in a picture are parsed line/row by line/row starting from the macroblock of pixels at top-left to the pixels at the bottom-right of the picture. In comparison with the parsing of the tile based picture, where all the pixels in the Tile-1 302-1 are parsed before any pixels from the Tile-2 302-2 or tile-3 302-3, the first row of macroblocks of pixels being processed include some macroblocks of pixels from Tile-1 302-1, Title-2 302-2, and Tile-3 302-3, which are on the same row, R1, in the raster scan order.

Efficient Tile Decoding Using a Two-Stage Parser

Figure 4:
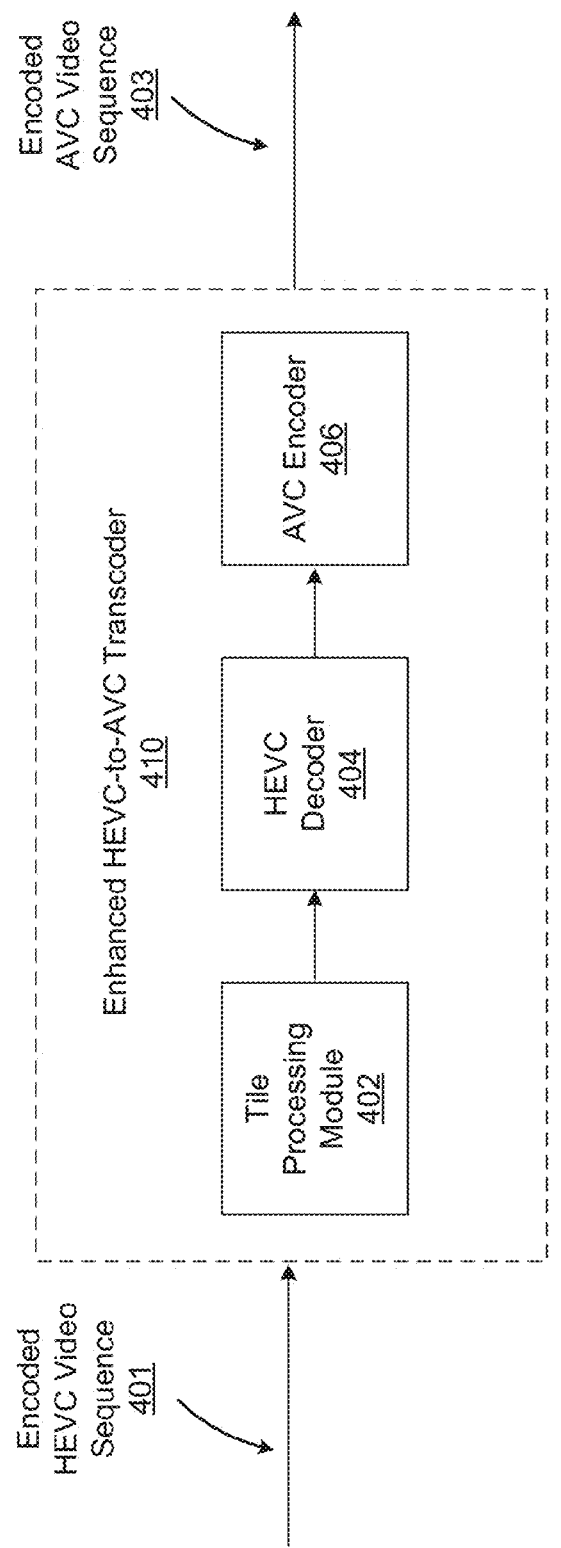
FIG. 4 illustrates a block level architecture of an enhanced HEVC-to-AVC transcoder according to one embodiment.

Different bitstream parsing orders, i.e., tile scan order and raster scan order, present a challenge when transcoding an HEVC picture at block level (e.g., CTU/macroblock level) that contains multiple tiles into a non-tile based AVC or MPEG-2 picture because CABAC state information is not allowed to cross tile boundaries. The challenge is compounded by different entropy coding context memory requirements for the two different scanning orders. FIG. 4 illustrates a block level architecture of an enhanced HEVC-to-AVC transcoder 410 configured to provide a solution to the challenge according to one embodiment. In one embodiment, the enhanced HEVC-to-AVC transcoder 410 has a tile processing module 402, an HEVC decoder 404 and an AVC encoder 406. The transcoder 410 receives an input video sequence 401 compressed in an HEVC format and transcodes the input video sequence 401 into an encoded output video sequence 403 in an AVC format.

The HEVC decoder 404 is configured to decode a video sequence compressed in accordance to the HEVC standard into a decoded video bitstream. Any HEVC decoding mechanism known to those of ordinary skill in the art is available to implement the HEVC decoder 404. In one embodiment, the HEVC decoder 404 receives an HEVC video bitstream processed by the tile processing module 402 and decodes the HEVC video bitstream by the following operations: entropy decoding the HEVC video bitstream, inverse transforming the bitstream, adding motion prediction residuals for motion compensation and reconstructing the bitstream into a decompressed video bitstream.

The AVC encoder 406 is configured to receive the decompressed video bitstream generated by the HEVC decoder 404 and re-encodes the decompressed video bitstream into an output video bitstream/sequence in an AVC format. Any AVC encoding mechanism known to those of ordinary skill in the art is available to implement the AVC encoder 406. In one embodiment, the AVC encoder 406 re-encodes the decompressed video bitstream generated by the HEVC decoder 404 by performing the following operations: inter- or intra-predicting coding blocks of a video frame of the decompressed video bitstream using motion estimation, discrete cosine transforming (DCT) the prediction residuals, quantizing the DCT coefficients and entropy coding the output from the quantization.

Figure 5:
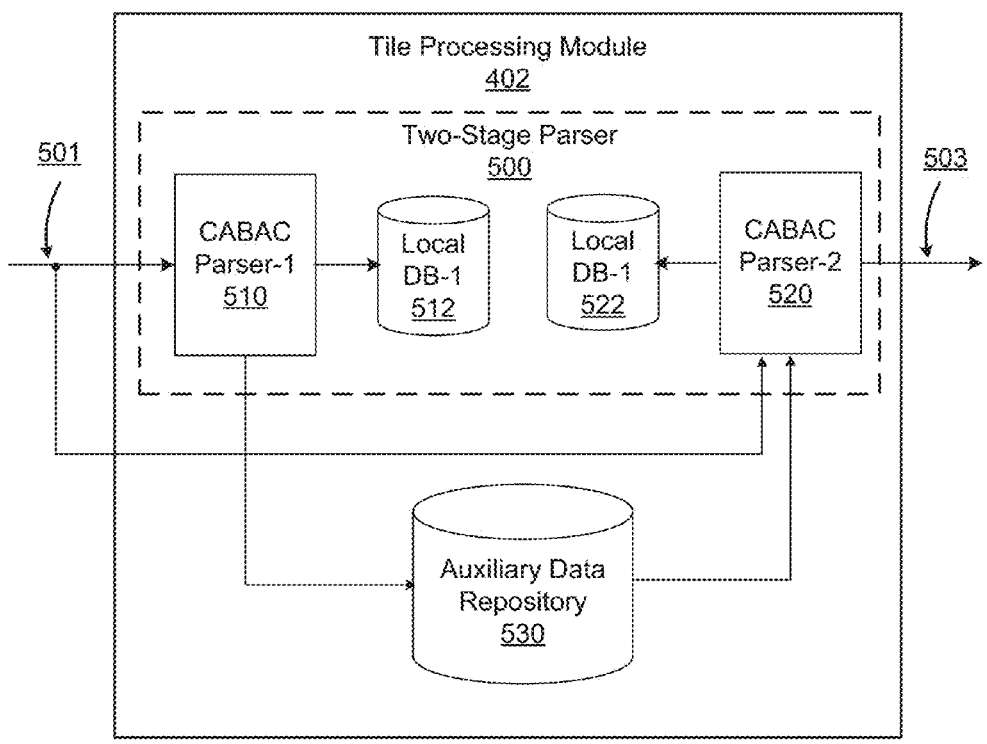
FIG. 5 is a block level illustration of a tile processing module according to one embodiment.

The tile processing module 402 of the transcoder 410 receives the input video sequence 401 compressed in an HEVC format and preprocesses the input video sequence 401. In one embodiment, the preprocessing operation includes parsing the input video sequence 401 in two stages using a two-stage parser. FIG. 5 is a block level illustration of the tile processing module 402 according to one embodiment. The tile processing module 402 includes a two-stage parser 500 and an auxiliary data repository 530. The two-stage parser 500 includes a CABAC Parser-1 510 configured for a first stage parsing and a CABAC Parser-2 520 configured for a second stage parsing. Each of the CABAC parsers 510 and 520 has a local storage such as the local database 512 and 514, respectively, to store locally the auxiliary data generated during the parsing. Other embodiments of the two-stage parser 500 may include just one CABAC parser, which is configured to perform both the first stage parsing and the second stage parsing. For example, either one of the CABAC parser 510 and 520 can be configured to function as the two-stage parser 500 for performing the parsing in two stages. As illustrated in FIG. 5, the two-stage CABAC parsing is different from entropy transcoding, where a first-stage CABAC parser generates a new bitstream that is in raster scan order. In the two-stage CABAC parsing shown in FIG. 5, the second stage CABAC parser, e.g., the parser 520, uses the same input bitstream, e.g., input bitstream 501, in conjunction with the auxiliary data generated by the first stage parser 510. In another embodiment, the first stage CABAC parser 510 outputs one or more slices of an entropy transcoded bitstream in tile scan order. The second stage CABAC parser 510 is configured to reorder and decode the entropy transcoded slices in raster order.

In one embodiment, the repository 530 is a data storage for storing auxiliary data generated by the two-stage parser 500. The auxiliary data is CABAC state data including, e.g., the CABAC context models, the arithmetic coder variables, the contextual variables, and the current bitstream position collected during a first stage parsing operation. Other information generated during the first stage CABAC parsing operation, e.g., tile structure and tile position, can also be stored in the repository 530 and/or local databases 512 and 522 to enhance the HEVC-to-AVC transcoding.

In the embodiment illustrated in FIG. 5, the CABAC Parser-1 510 is configured to perform the first stage parsing of the input bitstream 501. The CABAC Parser-1 510 receives the input stream 501 encoded in an HEVC format, parses the input bitstream 501 in tile scan order and generates CABAC state data associated with the input bitstream 501. The input stream 501 encoded in the HEVC format is partitioned into multiple tiles, each of which has multiple CTUs. The input bitstream 501 has the tile structure and tile partitioning information, such as the whether the tiles are portioned uniformly indicated by the "uniform_spacing_flag" variable associated with the input bitstream 501.

The first stage CABAC parser 510 operates in tile scan order. The parser 510 identifies one or more CTUs in a tile based picture, saves the CABAC state data for each identified CTU and generates a list of the identified CTUs, e.g., list L. In one embodiment, the identified CTUs include the first CTU in each CTU row within each tile For each identified CTU, before parsing the CTU, its CABAC state data is copied and stored in the local database 512 and the repository 530. The copied CABAC state of an identified CTU is associated with the CTU position of the identified CTU in the input bitstream 501. The identified CTU is recorded in the list of identified CTUs (i.e., list L) for the picture. In one embodiment, the list L is generated for each video frame of the input video stream 501. After a video frame is fully decoded, the list L associated with the video frame can be deleted. For next video frame being processed, a new list L associated with the next video frame is generated.

Figure 6A:
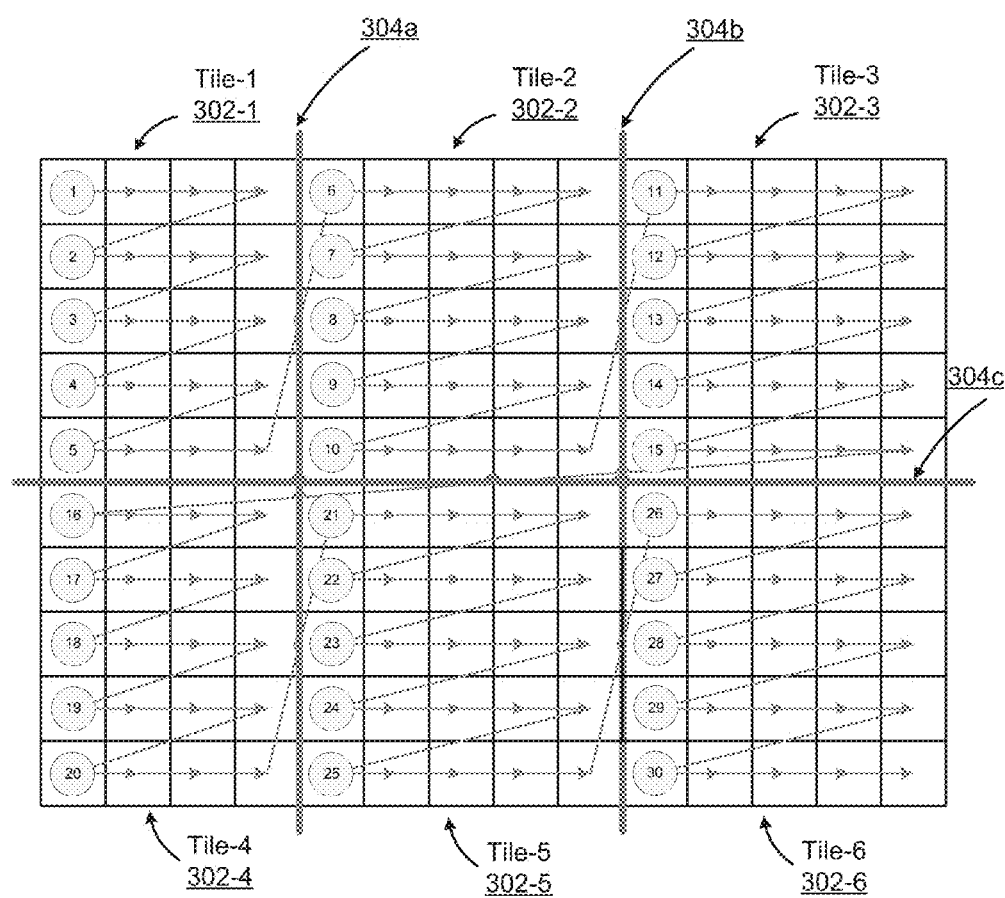
FIG. 6A illustrates parsing a tile based video frame/picture by a first parser of the tile processing module according to one embodiment.

FIG. 6A illustrates parsing a tile based video frame/picture by the first parser 510 of the tile processing module 402 according to one embodiment. The picture illustrated in FIG. 6A corresponds to the picture illustrated in FIG. 3A, and the picture is portioned into 6 tiles: Tile-1 302-1 to Tile-6 302-6. The first stage CABAC parser 510 processes the six tiles in tile scan order, starting with the first CTU of Tile-1 302-1 and ending with the last CTU of Tile-6 302-6. The parser 510 identifies the CTUs, whose CABAC states and CTU positions need to be stored for the second stage parsing. The identified CTUs include the first CTU of each tile of the picture, i.e., CTU 1 of Tile-1, CTU 6 of Tile-2, CTU 11 of Tile-3, CTU 16 of Tile-4, CTU 21 of Tile-5 and CTU 26 of Tile-6. The identified CTUs also include other CTUs whose tile scan order is different from its corresponding raster scan order. Accordingly, the further identified CTUs include each first CTU on the subsequent rows of a tile. Taking Tile-1 as an example, the further identified CTUs of tile-1 include CTU2, CTU3, CTU 4 and CTU5. The identified CTUs of the pictured are circled and numbered in the illustration of FIG. 6A, and the numbers associated with the identified CTUs indicate the relative parsing order of the identified CTUs in the picture. It is noted that although the CABAC state changes from one CTU to the next CTU and a parser decodes one bin at a time, the tile processing module 402 stores the CABAC state at the start of a CTU row before any bin has been decoded in that CTU row. Associating the CABAC state with a CTU row allows non-identified CTUs following an identified CTU in the same CTU row to be decoded using the CABAC state saved for that CTU row. For example, CTU1 and three non-identified CTUs that follow CTU1 can be decoded in sequence after restoring the CABAC state saved for CTU1. In one embodiment, for each identified CTU, the list L also includes the identifications or CTU positions of the CTUs that follow the identified CTU on the same CTU row.

After the first stage CABAC parser is finished with a tile based picture, the list of the identified CTUs needs to be sorted in raster scan order such that a second stage CABAC parser is able to operate in raster scan order for the HEVC-to-AVC transcoding. The sorted list L contains the identified CTUs rearranged in an order that enables the second stage CABAC parser to operate in raster scan order. In one embodiment, the tile processing module 402 uses a second stage CABAC parser such as the CABAC Parser-2 520 shown in FIG. 5 to iterate through the list of the identified CTUs. The CABAC state at the beginning of the list L is copied to the CABAC parser 520 to parse the CTUs associated with the CABAC state, which includes the identified CTU and other non-identified CTUs that follow the identified CTU in tile scan order. Responsive to the CABAC state being copied to the CABAC parser 520, the copied CABAC state is removed from the list L to free computer resources such as computer memory. The parser 520 parses the CTUs until the bitstream position indicated in the next entry in the list L. In this parsing process, the second stage CABAC parser 520 operates in raster scan order using the list L. The parsing operation in the second stage parsing includes decoding syntax elements of CTUs at syntax level.

Figure 6B:
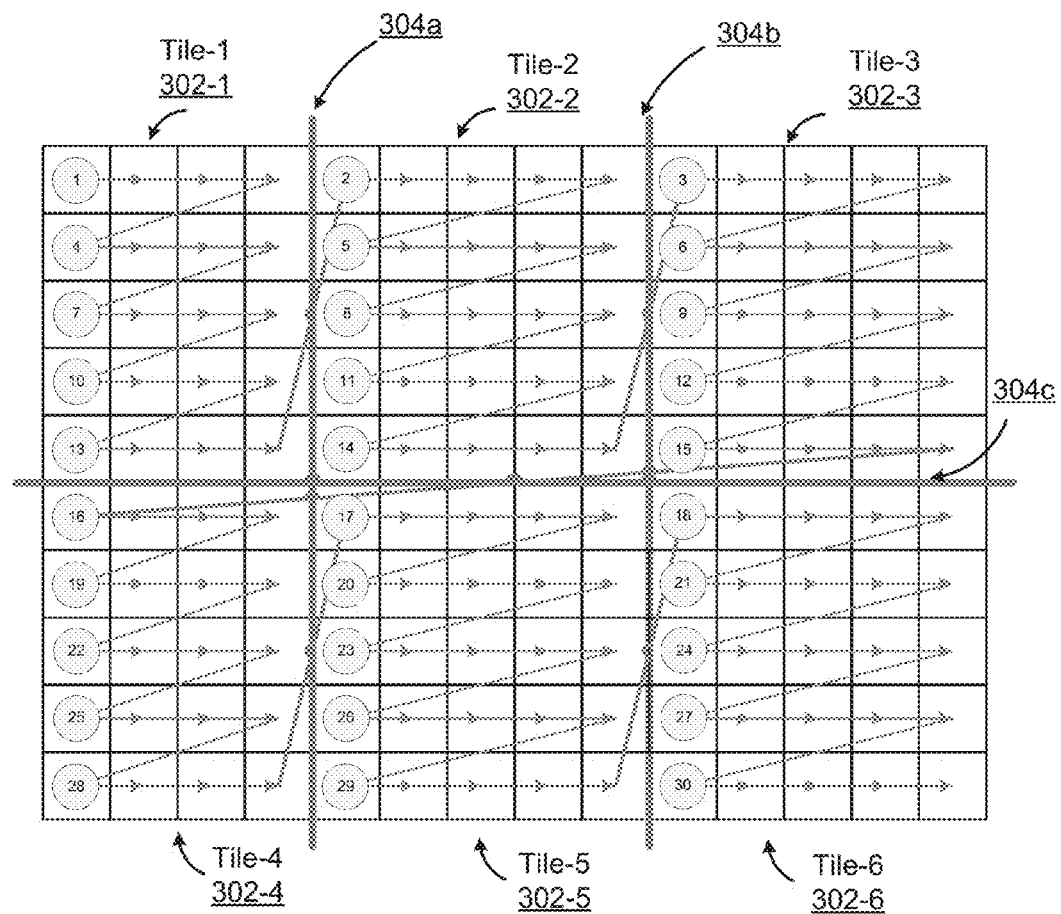
FIG. 6B illustrates parsing a tile based video frame/picture by a second parser of the tile processing module according to one embodiment.

FIG. 6B illustrates parsing a tile based video frame/picture by the second parser 520 of the tile processing module 402 according to one embodiment. The second parser 520 receives the same input stream 501 as the first stage parser 510 and each picture of the input stream 501 is partitioned into one or more tiles and each tile has multiple CTUs. The second parser 520 starts parsing with the first CTU, CTU1, of the Tile-1 by copying the CABAC state associated with CTU1 from the list L. The second parser 520 continues parsing the remaining three CTUs on the same row as CTU1 using the CABAC state associated with CTU1. In contrast with parsing in tile scan order as illustrated in FIG. 6A, the second parser 520 parses CTU2, which corresponds to CTU6 of Tile-2 302-2 in FIG. 6A. The second parser 520 continues parsing the remaining four CTUs that follow the CTU2 in tile scan order. The second parser 520 continues the parsing similarly until all the CTUs in the picture are parsed.

To further illustrate the different parsing orders between the first stage parsing and the second stage parsing, Table 1 below shows the mapping of the identified CTUs in the first stage parsing illustrated in FIG. 6A to the CTUs in the second stage parsing illustrated in FIG. 6B.

TABLE 1

| CTU in the First Stage Parsing | CTU in the Second Stage Parsing |
| --- | --- |
| CTU1 | CTU1 |
| CTU2 | CTU4 |
| CTU3 | CTU7 |
| CTU4 | CTU10 |
| CTU5 | CTU 13 |
| CTU6 | CTU2 |
| CTU7 | CTU5 |
| CTU8 | CTU8 |
| CTU9 | CTU11 |
| CTU10 | CTU14 |
| CTU11 | CTU3 |
| CTU12 | CTU6 |
| CTU13 | CTU9 |
| CTU14 | CTU12 |

TABLE 1-continued

| CTU in the First Stage Parsing | CTU in the Second Stage Parsing |
| --- | --- |
| CTU15 | CTU15 |
| CTU16 | CTU16 |
| CTU17 | CTU19 |
| CTU18 | CTU22 |
| CTU19 | CTU25 |
| CTU20 | CTU28 |
| CTU21 | CTU17 |
| CTU22 | CTU20 |
| CTU23 | CTU23 |
| CTU24 | CTU26 |
| CTU25 | CTU29 |
| CTU26 | CTU18 |
| CTU27 | CTU21 |
| CTU28 | CTU24 |
| CTU29 | CTU27 |
| CTU30 | CTU30 |

Figure 7:
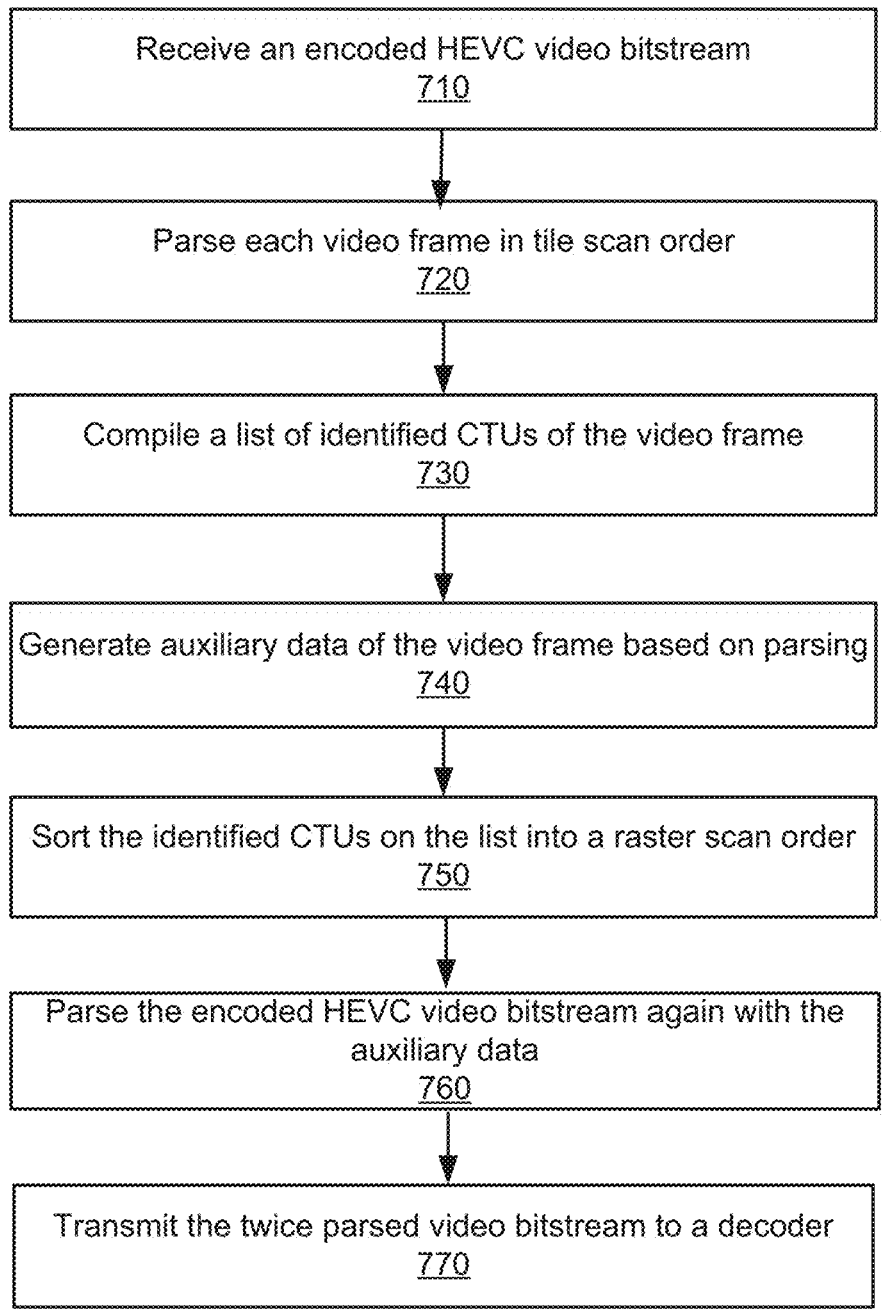
FIG. 7 is a flowchart of decoding tiles for efficient transcoding of a tile based video into a non-tile based video according to one embodiment.

FIG. 7 is a flowchart of decoding tiles for efficient transcoding of a tile based video into a non-tile based video according to one embodiment. A tile processing module, e.g., the tile processing module 402 of the HEVC-to-AVC transcoder 410, is configured to receive 710 an encoded HEVC video bitstream. Each video frame/picture of the encoded HEVC video bitstream is portioned into one or more tiles and each tile contains multiple CTUs. The tile processing module 402 parses 720 each video frame of the encoded HEVC video bitstream in tile scan order by the first stage CABAC parser 510 as illustrated in FIG. 5. The first stage parser 510 identifies CTUs whose CABAC state needs to be stored before the CTUs being parsed. The identified CTUs include the first CTU of each tile and CTUs whose position in tile scan order is different from the position in raster scan order. The tile processing module 402 compiles 730 a list of identified CTUs of the video frame and generates 740 auxiliary data associated with the identified CTUs. In one embodiment, the auxiliary data includes CABAC state of each identified CTU, e.g., the CABAC context models, the arithmetic coder variables, the contextual variables, and the current bitstream position.

During the second stage parsing, the tile processing module 402 sorts 750 the identified CTUs on the list generated by the first stage parsing and parses 760 the same encoded HEVC video bitstream in raster scan order by the second stage CABAC parser 520. The second stage parsing is guided by the list of the identified CTUs and their auxiliary data generated from the first stage parsing. In one embodiment, the second stage CABAC parser 520 iterates through the list of the identified CTUs and copies the CABAC state of each CTU on the list and uses the copied CABAC state data to parse the identified CTU and the non-identified CTUs that follow the identified CTU in tile scan order. After copying the CABAC state data of an identified CTU on the list, the second stage parser 520 removes the CTU from the list to free some computer resources. After the second stage parsing, the tile processing module 402 transmits 770 the twice parsed video bitstream to a decoder, e.g., the HEVC decoder 404 of the HEVC-to-AVC transcoder 410 illustrated in FIG. 4, for further processing.

Application of Efficient Tile Decoding—Single-Stage Parsing with Entry Point Offsets The HEVC standard optionally allows for communicating tile entry points offsets to the decoder, e.g., by sending the offsets in the slice header containing the tile to the decoder. The tile entry point offsets indicate the bitstream location of the start of each tile in a coded picture. With the known tile entry point offsets, the enhanced HEVC-to-AVC transcoder 410 is configured to parse an encoded HEVC video bitstream in a single stage and generates a new bitstream for decoding in raster scan order. In case tile entry point offsets are not provided in the encoded video bitstream, a first stage CABAC parser, e.g., the first stage CABAC parser 510 illustrated in FIG. 5, can be used to parse the video bitstream to generate the tile entry point offsets.

In one embodiment, either one of the CABAC parsers, 510 and 520, of the tile processing module 402 can be configured to perform the single stage parsing of an encoded HEVC video bitstream with the known tile entry point offsets. Referring to FIG. 6B for the illustration of the single-stage parsing and using the CABAC parser 520 as an example, in step 1, the parser 520 starts at the top-left CTU identified with the circled 1, i.e., CTU1. In step 2, the parsing proceeds from left to right until the boundary of the tile, i.e., 304*a*, is encountered. After the right-most CTU in the current CTU row of the current tile, i.e., Tile-1 302-1, has been parsed, the CABAC state is saved, which corresponds to the initial CABAC state for the CTU identified with the circle 4, i.e., CTU4.

In step 3, the tile entry point offset for the next tile (i.e., Tile-2 302-2) is used to start the parsing process at the CTU identified with the circle 2, i.e., CTU2. In step 4, the parsing proceeds from left to right until the boundary of the tile, i.e., 304*b*, is encountered. After the right-most CTU in the current CTU row of the current tile, i.e., Tile-1 302-2, has been parsed, the CABAC state is saved, which corresponds to the initial CABAC state for the CTU identified with the circle 5, i.e., CTU5.

In step 5, the tile entry point offset for the next tile (i.e., Tile-3 302-3) is used to start the parsing process at the CTU identified with the circle 3, i.e., CTU3. In step 6, the parsing proceeds from left to right until the boundary of the picture is encountered. After the right-most CTU in the current CTU row of the current tile, i.e., Tile-1 302-3, has been parsed, the CABAC state is saved, which corresponds to the initial CABAC state for the CTU identified with the circle 6, i.e., CTU6.

In step 7, the parsing resumes with the CTU identified with the circle 4, i.e., CTU4, using the CABAC state previously saved in step 2. After the right-most CTU in the current CTU row of the current tile has been parsed, the CABAC state is saved, which corresponds to the initial CABAC state for the CTU identified with the circled 7, i.e., CTU7. The CABAC parser 520 repeats step 6 and step 7 described above until the next row of tiles, starting with CTU7. At the beginning of the next row of tiles, the CABAC parser 520 repeats step 2 and step 7 until all the CTUs on the same row across Tile-1 302-1, Tile-2 302-2 and Tile-3 302-3 are parsed.

Application of Efficient Tile Decoding—Wavefront Parallel Decoding

The HEVC standard supports wavefront parallel processing, which enables multiple CTU rows in a video frame to be processed in parallel. When wavefront parallel processing is enabled, a slice is divided into rows of CTUs, where the second row of CTUs are processed after only two CTUs in the first row have been processed and the third row of CTUs are processed after only two CTUs in the second row have been processed, and so on. Using the saved CABAC state data by the tile processing module 402 described above enables wavefront parallel decoding by allowing independent decoding to start at CTUs at row boundaries. For example, when wavefront parallel processing is enabled in an HEVC input bitstream, the CABAC state after decoding the second CTU in a row is saved and then restored before decoding the CTU in the first column of the next CTU row. This allows a properly designed decoder to take advantage of wavefront parallelism. However, there is a drawback with conventional wavefront parallel processing methods when wavefront parallel processing is not enabled in the input bitstream because a wavefront-enabled decoder cannot decode the bitstream using wavefront parallelism. The embodiments of the tile processing module 402 provide a solution to overcome the drawback.

Figure 8:
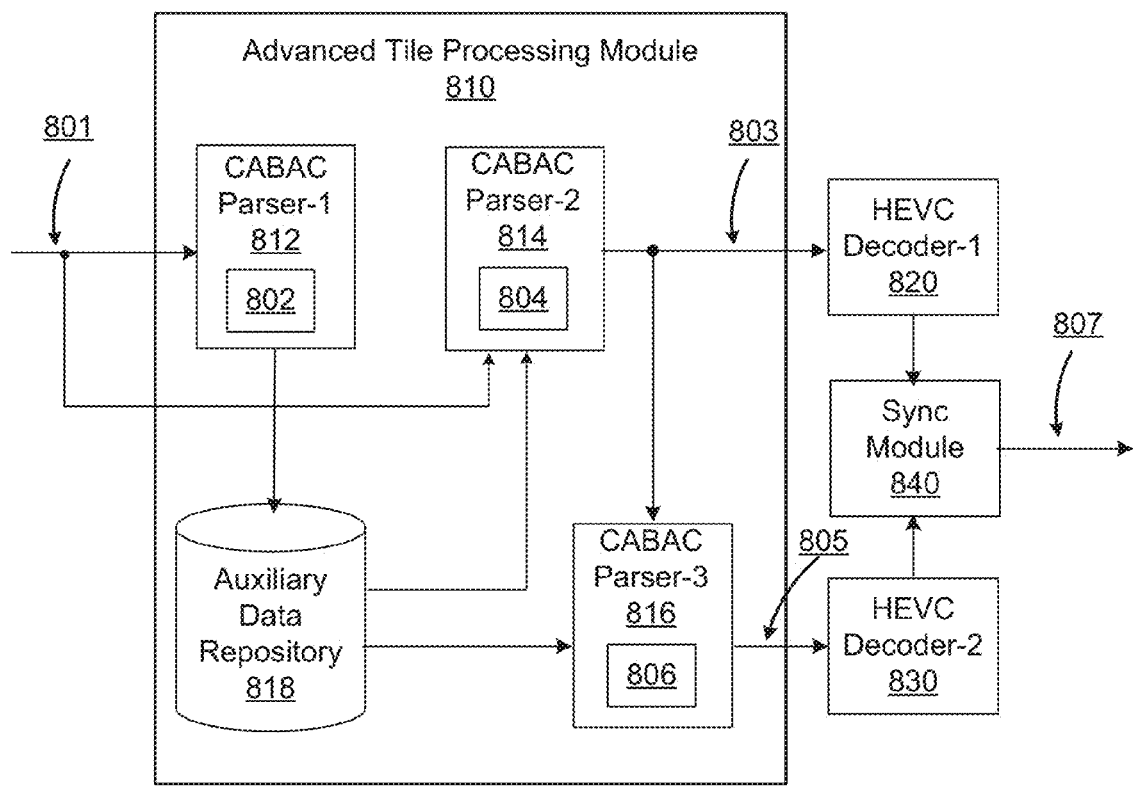
FIG. 8 is a block level illustration of an advanced tile processing module for efficient video transcoding with parallel tile decoding capabilities according to one embodiment.

FIG. 8 is a block level illustration of an advanced tile processing module 810 for efficient video transcoding with wavefront parallel tile decoding capabilities according to one embodiment. In the embodiment illustrated in FIG. 8, the advanced tile processing module 810 has three CABAC parsers, CABAC Parser-1 812, CABAC Parser-2 814 and CABC Parser-3 816, and an auxiliary data repository 818. Each CABAC parser may have a local storage for storing locally the auxiliary data such as 802, 804 and 806 for CABAC Parser-1 812, CABAC Parser-2 814 and CABC Parser-3 816, respectively. Other embodiments of the advanced tile processing module 810 may have additional CABAC parsers and other different computer modules.

In one embodiment, the CABAC Parser-1 812 is configured to function as a first-stage parser (e.g., CABAC Parser-1 510 illustrated in FIG. 5) that saves the CABAC states at the start of each CTU row to the auxiliary data repository 818. CABAC Parser-2 814 and CABAC Parser-3 816 are configured to work in parallel to decode one CTU row by each parser using the CABAC states saved in the repository 818. In one embodiment, the parser 814 and parser 816 operate in parallel on neighboring rows. For example, the parser 814 is configured to parse CTU row 1 and the parser 816 is configured to parse CTU row 2 in parallel with the parser 814. In response to the parser 814 finishing parsing the row 1, the parser 814 is configured to parse row 3. Similarly, the parser 816 is configured to parse row 4 responsive to finishing parsing the row 2. The parser 814 and the parser 816 continue the parsing until all rows of a video frame are parsed. The parser 814 and the parser 816 are synchronized such that the parser 812 operates ahead of both parsers 814 and 816 and that the parser 814 and the parser 816 wait for each other while parsing the neighboring rows.

To transcode the encoded HEVC video bitstream 801, the advanced tile processing module 810 is communicatively coupled with two HEVC decoders, HEVC Decoder-1 820 and HEVC Decoder-2 830. The HEVC decoder 820 is configured to decode the bitstream 803 and the HEVC decoder 830 is configured to decode the bitstream 805. The functionalities of the HEVC decoders 820 and 830 can be referred to the HEVC decoder 404 described in FIG. 4. The HEVC decoders 820 and 830 are configured to communicate with a synchronization module 840, which synchronizes data dependencies between different bitstreams generated by the CABAC parsers 812, 814 and 816 during parallel processing the tiles of the video bitstream 801. Another type of data dependency exists between the HEVC decoders 820 and 830 for decoding CTU rows. For example, if one of the HEVC decoders 820 and 830 operates on a lower CTU row, that HEVC decoder needs to be synchronized with the other HEVC decoder by waiting for the other HEVC decoder to finish decoding two CTU columns ahead. Any data synchronization scheme known to those of ordinary skills in the art, e.g., wavefront processing synchronization, can be used to implement the synchronization module 840. The synchronization module 840 generates a synchronized bitstream 807 for further processing such as re-encoding into an output video in an AVC or MPEG-2 format.

Additional Configuration Considerations

Different bitstream parsing orders, i.e., tile scan order and raster scan order, present a challenge when transcoding an HEVC picture that contains multiple tiles into a non-tile based AVC or MPEG-2 picture because CABAC state information is not allowed to cross tile boundaries. The challenge is compounded by different entropy coding context memory requirements for the two different scanning orders. To efficiently transcode an input video sequence that is partitioned into tiles into a non-tiled based video, a tile processing module is provided to parse a tile based input video sequence in two stages, which enables entropy coding parameters, e.g., CABAC state information, generated from the first stage to be used in the second stage.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, e.g., as shown and described in FIG. 5. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods, e.g., described with FIG. 7, may be performed, at least partially, by one or more processors, e.g., 102, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented, e.g., processor 102. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors, e.g., 102, may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory 104). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for transcoding a tile based video sequence using efficient tile decoding through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method for transcoding a tile based video bitstream, the method comprising:

receiving a picture of an input video bitstream at a first parser processor, the picture comprising a plurality of coding blocks partitioned into a plurality of tiles, each tile comprising tile rows of coding blocks;

parsing, performed by the first parser processor, the plurality of coding blocks of the picture in a tile scan order to produce a plurality of subsets of entropy coding state data, each subset of entropy coding state data associated with a corresponding tile row of coding blocks of each tile;

generating, performed by the first parser processor, a list of identified coding blocks in the tile scan order based on the parsing of the plurality of coding blocks, wherein the list of identified coding blocks includes a plurality of identifiers, each identifier associated with a corresponding first coding block of each tile row of coding blocks of each tile, each identifier indicating a position of the corresponding first coding block in the input video bitstream;

storing, performed by the first parser processor, the plurality of subsets of entropy coding state data and the list of identified coding blocks in a data repository coupled to the first parser processor and to a second parser processor, wherein each identifier of the list of identified coding blocks is associated with a corresponding subset of entropy coding state data;

receiving the picture of the input video bitstream at the second parser processor;

parsing, performed by the second parser processor, the same plurality of coding blocks of the picture in a raster scan order by using the list of identified coding blocks and the plurality of subsets of entropy coding state data stored in the data repository to produce a first portion of a parsed video bitstream, wherein the parsing the same plurality of coding blocks comprises:

sorting, performed by the second parser processor, the list of identified coding blocks into the raster scan order, wherein a sequence of tile rows in the raster scan order corresponds to a full row of coding blocks that spans the picture, and for each tile row in the full row of coding blocks that spans the picture:

identifying a present identifier from the sorted list of identified coding blocks that corresponds to a present position in the input video bitstream,
restoring a selected subset of entropy coding state data that corresponds to the present identifier; and
decoding syntax elements of a set of coding blocks that correspond to a present tile row using the selected subset of entropy coding state data.

2. The method of claim 1, wherein a coding block of the picture is a coding tree unit (CTU) of the picture, the plurality of the coding blocks of the picture being structured in a quad tree structure.

3. The method of claim 1, wherein
the first parser processor is configured to implement CABAC (context adaptive binary arithmetic coding).

4. The method of claim 1, wherein parsing the same plurality of coding blocks of the picture in a raster scan order further comprises:
removing the selected subset of entropy coding state data from the data repository, after the selected subset of entropy coding state data has been restored.

5. The method of claim 1, further comprising:
obtaining tile entry point offsets associated with the picture of the input video bitstream, a title entry point offset indicating start of a tile in the picture of the input video bitstream.

6. The method of claim 5, wherein obtaining tile entry point offsets associated with the picture comprises:
parsing tile headers of the tiles of the picture, wherein the tile header of a tile contains the tile entry point offset of the tile.

7. The method of claim 5, wherein obtaining tile entry point offsets associated with the picture further comprises:
parsing the plurality of the coding blocks of the picture of the input video bitstream in a tile scan order; and
generating the tile entry point offsets based on the parsing.

8. The method of claim 1, further comprising:
parsing, performed by a third parser processor, a second full row of coding blocks of the same plurality of coding blocks of the picture in the raster scan order by using the list of identified coding blocks and the plurality of subsets of entropy coding state data stored in the data repository to produce a second portion of the parsed video bitstream, wherein
the second full row is a neighboring row of a first full row parsed by the second processor,
the parsing of the second full row by the third parser processor begins after the second parser processor has parsed a first and second coding block in the first full row, and
the parsing by the third parser processor continues in parallel with the parsing by the second parser processor; and
parsing, performed by the second parser processor, a third full row of coding blocks of the same plurality of coding blocks in the raster scan order to produce a third portion of the parsed video bitstream, wherein
the third full row is a neighboring row of the second full row,
the parsing of the third full row by the second parser processor begins after the third parser processor has parsed a first and second coding block in the second full row, and
the parsing by the second parser processor continues in parallel with the parsing by the third parser processor.

9. The method of claim 8, further comprising:
synchronizing data dependencies between the first and second portions of the parsed video bitstream to output a first portion of a final parsed video bitstream; and
synchronizing data dependencies between the second and third portions of the parsed video bitstream to output a second portion of the final parsed video bitstream.

10. The method of claim 8, wherein the second parser processor and the third parser processor continue to parse neighboring full rows in an alternating manner until all full rows of the picture are parsed in the raster scan order.

11. The method of claim 8, wherein the first parser processor operates ahead of the second and third parser processors, and the second and third parser processors wait for each other to complete parsing of a first and second coding block of a respective neighboring full row before beginning parsing of a next neighboring full row.

12. The method of claim 1, wherein each of the plurality of subsets of entropy coding state data comprises one or more of a group including: context models, arithmetic coder variables, contextual variables, and a current bitstream position.

13. The method of claim 1, wherein the first parser processor stores each subset of entropy coding state data at a start of a corresponding tile row before any bin has been decoded.

14. A non-transitory computer-readable storage medium storing computer program instructions, executed by a processor, for transcoding a tile based video bitstream, the computer program instructions comprising instructions for:
receiving a picture of an input video bitstream, the picture comprising a plurality of coding blocks partitioned into a plurality of tiles, each tile comprising tile rows of coding blocks;
parsing the plurality of coding blocks of the picture in a tile scan order to produce a plurality of subsets of entropy coding state data, each subset of entropy coding state data associated with a corresponding tile row of coding blocks of each tile;
generating a list of identified coding blocks in the tile scan order based on the parsing of the plurality of coding blocks, wherein the list of identified coding blocks includes a plurality of identifiers, each identifier associated with a corresponding first coding block of each tile row of coding blocks of each tile, each identifier indicating a position of the corresponding first coding block in the input video bitstream;
storing the plurality of subsets of entropy coding state data and the list of identified coding blocks in a data repository, wherein each identifier of the list of identified coding blocks is associated with a corresponding subset of entropy coding state data;
parsing the same plurality of coding blocks of the picture in a raster scan order by using the list of identified coding blocks and the plurality of subsets of entropy coding state data stored in the data repository to produce a first portion of a parsed video bitstream,
wherein the parsing the same plurality of coding blocks comprises:
sorting the list of identified coding blocks into the raster scan order, wherein a sequence of tile rows in the raster scan order corresponds to a full row of coding blocks that spans the picture, and
for each tile row in the full row of coding blocks that spans the picture:

identifying a present identifier from the sorted list of identified coding blocks that corresponds to a present position in the input video bitstream, restoring a selected subset of entropy coding state data that corresponds to the present identifier, and decoding syntax elements of a set of coding blocks that correspond to a present tile row using the selected subset of entropy coding state data.

15. The computer-readable storage medium of claim 14, wherein a coding block of the picture is a coding tree unit (CTU) of the picture, the plurality of the coding blocks of the picture being structured in a quad tree structure.

16. The computer-readable storage medium of claim 14, wherein the computer program instructions for parsing the same plurality of coding blocks of the picture in a raster scan order further comprise computer program instructions for:

removing the selected subset of entropy coding state data from the data repository, after the selected subset of entropy coding state data has been restored.

17. The computer-readable storage medium of claim 14, further comprising computer program instructions for:

obtaining tile entry point offsets associated with the picture of the input video bitstream, a title entry point offset indicating start of a tile in the picture of the input video bitstream.

18. The computer-readable storage medium of claim 17, wherein the computer program instructions for obtaining tile entry point offsets associated with the picture comprise computer program instructions for:

parsing tile headers of the tiles of the picture, wherein the tile header of a tile contains the tile entry point offset of the tile.

19. The computer-readable storage medium of claim 17, wherein the computer program instructions for obtaining tile entry point offsets associated with the picture further comprise computer program instructions:

parsing the plurality of the coding blocks of the picture of the input video bitstream in a tile scan order; and generating the tile entry point offsets based on the parsing.

20. A computer system for transcoding a tile based video bitstream, the system comprising:

a processor; and a non-transitory computer-readable storage medium storing computer program instructions, executed by the processor, the computer program instructions comprising instructions for:

receiving a picture of an input video bitstream, the picture comprising a plurality of coding blocks partitioned into a plurality of tiles, each tile comprising tile rows of coding blocks;

parsing the plurality of coding blocks of the picture in a tile scan order to produce a plurality of subsets of entropy coding state data, each subset of entropy coding state data associated with a corresponding tile row of coding blocks of each tile;

generating a list of identified coding blocks in the tile scan order based on the parsing of the plurality of coding blocks, wherein the list of identified coding blocks includes a plurality of identifiers, each identifier associated with a corresponding first coding block of each tile row of coding blocks of each tile, each identifier indicating a position of the corresponding first coding block in the input video bitstream;

storing the plurality of subsets of entropy coding state data and the list of identified coding blocks in a data repository, wherein each identifier of the list of identified coding locks is associated with a corresponding subset of entropy coding state data;

parsing the same plurality of coding blocks of the picture in a raster scan order by using the list of identified coding blocks and the plurality of subsets of entropy coding state data stored in the data repository to produce a first portion of a parsed video bitstream, wherein the parsing the same plurality of coding blocks comprises:

sorting the list of identified coding blocks into the raster scan order, wherein a sequence of tile rows in the raster scan order corresponds to a full row of coding blocks that spans the picture, and for each tile row in the full row of coding blocks that spans the picture:

identifying a present identifier from the sorted list of identified coding blocks that corresponds to a present position in the input video bitstream, restoring a selected subset of entropy coding state data that corresponds to the present identifier, and decoding syntax elements of a set of coding blocks that correspond to a present tile row using the selected subset of entropy coding state data.

21. The system of claim 20, wherein the computer program instructions for parsing the plurality of coding blocks of the picture comprise computer program instructions for:

identifying a subset of coding blocks from the plurality of coding blocks; and storing identifiers of the subset of coding blocks in the list of identified coding blocks, wherein the list of identified coding blocks is stored in the data repository.

22. The system of claim 20, wherein the list of identified coding blocks is generated in tile scan order.

23. The system of claim 20, wherein the computer program instructions for parsing the same plurality of coding blocks of the picture in a raster scan order comprise computer program instructions for:

sorting the list of identified coding blocks into the raster scan order; and copying entropy coding state data associated with each identified coding block from the data repository;

for a full row of coding blocks that spans the picture:

restoring entropy coding state data for a selected coding block from the sorted list of the identified coding blocks, the selected coding block having a position within the full row; and decoding syntax elements of coding blocks subsequent to the selected coding block that also have a position within the full row using the copied entropy coding state data of the selected coding block from the sorted list.

* * * * *